Patented June 21, 1927.

1,633,072

UNITED STATES PATENT OFFICE.

ALEX BROOKING DAVIS, OF CINCINNATI, OHIO, ASSIGNOR TO A. B. DICK, OF CHICAGO, ILLINOIS, A CORPORATION OF ILLINOIS.

STENCIL SHEET.

No Drawing.   Application filed March 26, 1924. Serial No. 702,148.

This invention is directed particularly to stencil sheets of the class employed for reduplication of autographic and typewritten matter by means of a mimeograph or other duplicator. Such sheets commonly comprise a paper base having an impressible coating which receives the type or stylus in the stencilizing operation. My object is to improve upon such stencil sheets with respect to the impressible coating. To this end I employ a coating which includes a polymerized hydrocarbon, or mixtures of such hydrocarbons with certain tempering or modifying agents having the effect, among other things, to reduce the tensile strength of overstrong ingredients so as to adapt the coating, as a whole, properly to respond to the pressure of type or other stencilizing medium. Pure rubber gum is an example of such a hydrocarbon which may advantageously be employed. Chemically, this is a polymeride of a definite chemical substance of the formula $C_5H_8$ known as isoprene, which is an unsaturated aliphatic hydrocarbon. Many other unsaturated hydrocarbons, however, while initially liquid, polymerize either spontaneously or upon chemical treatment, giving rubber-like substances with which good results may be obtained in the practice of this invention. Again, compounds of associated chemical structure result from the coagulation of the latex of other than the rubber tree. Thus, balata, the rubber-like substance resulting from the coagulation of the latex of the tree Mimusops balata, may also be employed to produce good results.

Many unsaturated substances when treated with the halogens, such as chlorine, bromine or iodine, and particularly with sulphur, form a union therewith, which in many instances results in the production of a rubber-like mass. Sulphur has the power of joining two or more molecules of many unsaturated substances together to form numerous products which are used as rubber substitutes. Thus, cottonseed oil when properly sulphurized gives a rubber-like mass which is readily incorporated with commercial rubber gum as a rubber substitute. Coating masses suitable for the production of stencil papers may be made from such masses, particularly those which also contain a portion of pure rubber gum. Thus, sulphurized cotton-seed oil mixed in equal proportion with pure rubber gum affords a rubber substitute which may be used for coating stencil paper within this invention. Many unsaturated oils, whether drying oils or not, may be polymerized or bodied by heat to rubber-like or flexible bodies, and these also may be employed either in substitution for or in admixture with pure rubber gum. All of these substances and similar or equivalent substances I denote herein as organic polymerides.

Few, if any, of these polymerides are, alone and without special treatment or combination with other ingredients, suitable for use as stencil coatings. Under this invention they are tempered, as by the use of a non-volatile agent, such as castor oil, and modified as by the use of fatty matter, such as waxes of suitable character, by the use of a plasticizing agent such as a halogenated hydrocarbon, and, if desired, by the use of an acetilated glycerin, such as triacetin.

By way of illustration, my invention may be practiced in the following manner, assuming that pure rubber is the particular organic polymeride which is to be employed. I first make a mixture of tempering and modifying agents in approximately the proportions here stated, i. e., 20 gr. carnauba wax, 15 gr. cerosene wax, 10 gr. heavy hydrocarbon oil, 30 gr. castor oil and 20 gr. chlorinated naphthalene. This mixture is heated to 100° C. when all the constituents melt and form a homogeneous mixture. I then stir in 150 c. c. coal tar light oil, such as benzol, toluol, xylol or the like. The resulting solution is homogeneous and almost entirely clear. It is now poured into a solution of 10 gr. pure rubber gum dissolved in 90 c. c. pure coal tar benzol, the whole being stirred, and, if desired, 3 c. c. triacetin added. If it be desired to give color to the mass so that a colored stencil may be produced, this may be done by adding to the mass a solution of a dye-stuff dissolved in a suitable organic solvent or a suspension of a dry color in a small amount of vehicle, such as castor oil.

The mixture compounded as above may be poured into a shallow pan or tray, its temperature being held at about 60–70° C., and sheets of paper, such as porous yoshino, drawn over or through it and then over a wire in order to remove excess solution from the sheets and return it to the pan. The coated sheets may then be hung in the air for about 24 hours during which the volatile solvents evaporate almost, if not quite, completely. The finished stencil sheets may now be stencilized, as by the stylus or typewriter, in the usual manner and from the stencils so produced a large number of copies may readily be obtained by means of a suitable duplicator.

The invention is not confined to the particular materials or proportions above mentioned for departures or variations therefrom are quite possible within wide limits. For example, carnauba and other waxes are obtainable of various melting points and oils vary considerably with respect, among other things, to viscosity. Even when the named constituents are employed, as their properties or characteristics vary, corresponding variation should be made in the proportions employed. Again, the properties of any one ingredient may be such as to make it desirable to increase or reduce the proportion of one or more of the ingredients, or even to omit them altogether. In addition to oils, fates and waxes, cellulose in a suitable form, such as cellulose nitrate, may readily be incorporated in the solution and will give excellent results. This applies also to proteins which may be dissolved in organic solvents. Where the constituents are all mutual solvents for each other, the evaporation of the volatile solvent leaves the coating as a homogeneous mass in the form of a solid solution. Constituents may be used which are not mutual solvents for each other but which are all soluble in the volatile solvent used, in which case the evaporation of the volatile solvent produces a coating which may more properly be regarded as a solid emulsion.

If desired, the coated stencil sheets, prepared as hereinabove explained, may be subjected to a vulcanizing process with a view to increasing their toughness, durability and insensitiveness to temperature changes. To this end the coated sheets may be hung in a closed chamber in which is placed a vessel containing sulphur chloride, to the vapors of which the sheets are exposed for a period of time sufficient to give the desired degree of vulcanization, or to partially or wholly saturate the double bonds, of the hydrocarbon polymer-rubber in this instance. This being a known process, in itself considered, further description would seem unnecessary. This is true also of the hot process of vulcanization, whereby sulphur is incorporated in a rubber-like mass and then united therewith by heat. It may be noted, however, that rubber (including balata) is not the only organic polymer which undergoes changes of the character commonly described as vulcanization. Thus unsaturated fatty acids combine with sulphur to give rubberlike substances, and such acids, or esters thereof, may be employed in stencil coatings. Also, many organic condensation products bearing an unsaturated bond between two or more carbons in their chemical structure may react similarly. Polymers suitable for this invention are those possessing elastic properties, capable of yielding colloidal solutions in organic solvents, amorphous in structure and capable of lending to the stencil sheet their predominant tensile strength.

In this invention there is a sharp distinction made between organic polymerides possessing the property of elasticity in the sense that rubber and rubber substitutes are elastic and another group of organic substances not possessing this property, certain types of which are polymeric substances and commonly classed as synthetic resin. It is the elastic or rubber like class of substances as distinguished from the resin class which are intended to be made the feature of this invention, and which for this purpose have been grouped under the name "organic polymerides". The resin class of polymeric substances has been made the feature of a copending application filed March 26, 1924 by applicant for stencil sheets and process of producing the same, Serial No. 702,147.

What I claim is:—

1. A stencil sheet including, as a principal ingredient of its coating, an organic polymer of elastic character, water insoluble and amorphous in structure.

2. A stencil sheet including, as a principal ingredient of its coating, a water insoluble organic polymer of elastic character, amorphous in structure and soluble in organic solvents.

3. A stencil sheet including, as a principal ingredient of its coating, a water insoluble organic polymer of elastic character, amorphous in structure and capable of yielding colloidal solutions with organic solvents.

4. A stencil sheet including, as a principal ingredient of its coating, an organic polymer of elastic character, non-crystalline in structure and capable of yielding colloidal solutions in an organic solvent.

5. A stencil sheet including, as a principal ingredient of its coating, an organic polymer of elastic character and soluble in organic solvents, and a tensile strength reducing agent.

6. A type-impressible stencil sheet consisting of a porous base upon which has been deposited by means of a volatile organic solvent a continuous coating including as a principal ingredient an organic polymer of elastic character.

7. A type-impressible stencil sheet consisting of a porous base upon which has been deposited by means of a volatile organic solvent a coating including an organic polymer of elastic character and modifying agents, in which coating the organic polymer predominates as to quantity.

8. A type-impressible stencil sheet consisting of a porous base upon which has been deposited a continuous type-impressible film including an organic polymer of elastic character and tensile strength reducing agents also soluble in the same solvent, in which the organic polymer is the predominant material possessing tensile strength.

9. A type-impressible stencil sheet consisting of a porous base upon which has been deposited a homogeneous film including as a principal ingredient an elastic organic polymer, amorphous in structure, and a tempering agent.

10. A type-impressible stencil sheet possessing a homogeneous film, the predominant strength of which is due to the inclusion in the coating of an elastic, amorphous organic polymer.

This specification signed this 24th day of March, 1924.

ALEX BROOKING DAVIS.